Jan. 26, 1943. L. M. DE KANSKI 2,309,172
VIBRATING PROCESSING MACHINE
Filed April 3, 1940 3 Sheets-Sheet 1

INVENTOR
LEON M. DE KANSKI
BY
Arthur Middleton
ATTORNEY

Jan. 26, 1943. L. M. DE KANSKI 2,309,172
VIBRATING PROCESSING MACHINE
Filed April 3, 1940 3 Sheets-Sheet 2
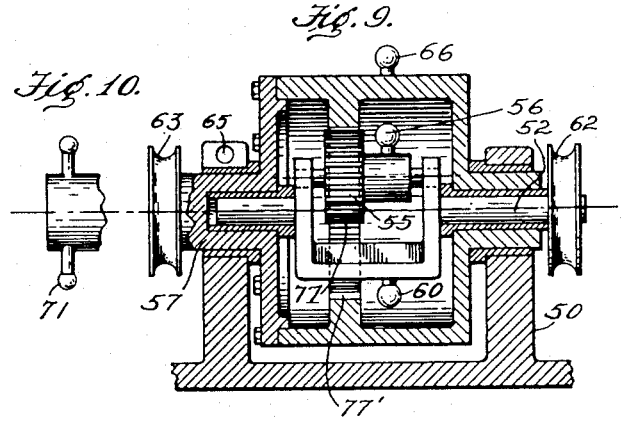
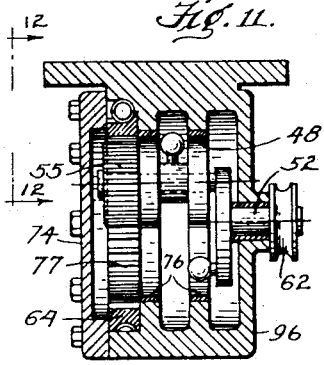
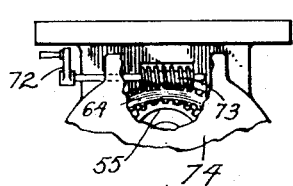
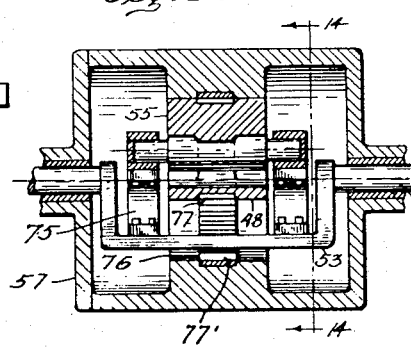
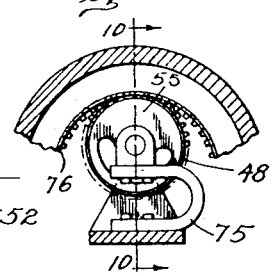
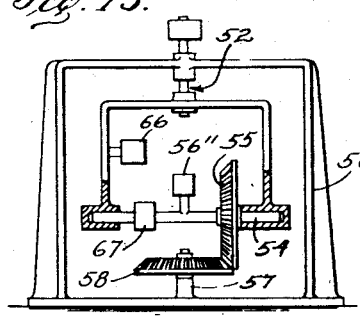
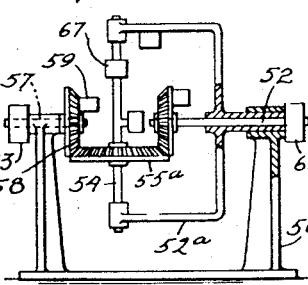
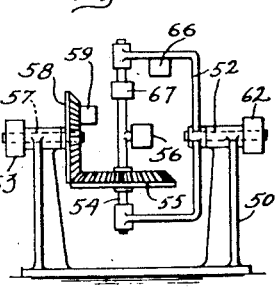
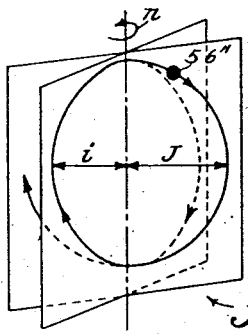
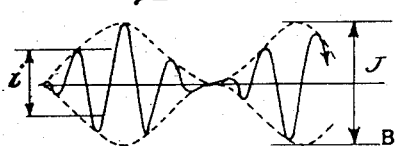
INVENTOR
LEON M. DE KANSKI
BY
ATTORNEY Jan. 26, 1943.                L. M. DE KANSKI                    2,309,172
                          VIBRATING PROCESSING MACHINE
                            Filed April 3, 1940          3 Sheets-Sheet 3

INVENTOR
LEON M. DE KANSKI
BY
ATTORNEY

Patented Jan. 26, 1943

2,309,172

UNITED STATES PATENT OFFICE 2,309,172

VIBRATING PROCESSING MACHINE

Leon M. De Kanski, New York, N. Y.

Application April 3, 1940, Serial No. 327,576

8 Claims. (Cl. 209—367)

This invention relates to processing vibrating machines, such as screens, separating tables, conveyors and similar machines. Generally defined, the object of the present invention is to propose a simple apparatus by means of which it is possible to obtain a complex vibratory motion, substantially a combination of a simple gyratory vibration with a vibration produced by a mass center provided with a planetary motion.

A further purpose of the invention is to obtain a vibrating unit in which the direction, amplitude and the type of vibration itself, dynamically and geometrically defined can be adjusted in order to suit any particular vibrating treatment of the materials.

Still further object of the invention is a combination of the aforementioned complex vibration producer with a resonance vibrating system, the advantages of which will be explained hereinafter. Still further object of the invention is to create an apparatus capable of producing three-dimensional vibrations.

Other objects and advantages will in part be specifically pointed out hereinafter and in part reside in the construction and arrangement described in this specification and particularly mentioned in the appended claims.

It should also be observed that the processing vibrating machines in combination with the vibrating arrangement as in this invention, may be constructed in all details excepting the mentioned vibrating arrangement and possess all the properties in a manner common in the art.

The invention is illustrated more or less diagrammatically in the accompanying drawings, herein.

Figures 1, 1$^a$, 1$^b$ are diagrammatic representations of the vibrator comprising an epicyclic wheeltrain having parallel axes.

Figure 9 is a constructional form of the type of vibration producer shown in Figure 1, comprising driving means for both coaxial members.

Figure 10 shows an alternative of the Figure 9 construction in which one of the coaxial members is non-rotatable but rotatably adjustable.

Figure 11 is another constructional form of the type of vibrator shown in Figure 1, comprising a combination of geared and rolling contact faces.

Figure 12 is a view in the direction 12—12 of Figure 11, with cover plate partly broken away to show adjustment means.

Figure 13 is a longitudinal sectional view of another constructional form of the type of vibrator shown in Figure 1, comprising a combination of geared and rolling contact faces, and bearings for the planetary member, that have a degree of resiliency.

Figure 14 is a cross-sectional view partly shown on line 14—14 in Figure 13.

Figure 15, 15$^a$, 15$^b$ are diagrammatic representations of the vibrating unit comprising an epicyclic gear train or wheel train with non-parallel axes.

Figure 16 is a three-dimensional diagram of the path of the mass center.

Figure 17 is a curve representing the projection into one plane of the forces produced in the three-dimensional system shown in Fig. 16.

Figure 18:
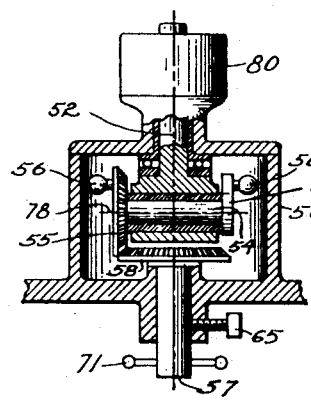

Figure 18 shows a constructional form of the type of vibrating unit shown in Figure 15.

Figures 19, 20:
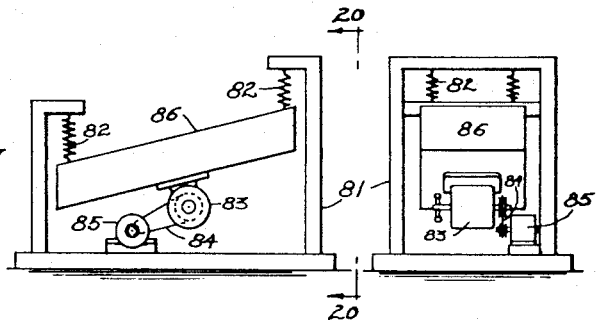

Figure 19 shows a general example of the application of the vibrating unit to a vibrating processing machine.

Figure 20 is an end view in the direction of arrows 20—20 of Figure 19.

The importance of application of vibration methods to the treatment of granular materials is well known. These methods are mainly applied for such operations as sizing, scalping and similar operations usually defined by screening. Another important application of these methods relates to the separation of bulk materials composed of particles having different physical properties such as specific gravity, surface characteristics, shape of the particles, etc. The action of the vibration in the aforementioned processes is extremely complex, and extensive research work made by many authors and by me shows that for a given material and setting of the machine firstly the geometrical and dynamical type of the vibrations to which the material is subjected have a fundamental importance in the results obtained; secondly, in many operations even the slightest changes in the type or direction of the vibration greatly influence the efficiency of the operation. In this respect it is obvious that a vibrating processing machine should be provided with as many adjustable characteristics as possible.

According to the nature of the operation to be made, the following characteristics of the processing machine should be obtainable and easily adjustable especially while the machine is in operation:

Slope of the operating surface.

Plane or planes in which the vibration occurs in respect to the operating surface.

Geometrical form of the vibration, i. e. gyrating, reciprocating, straight-line, curvilinear, etc.

Dynamical form of the vibration; i. e. distribution of the accelerations.

Frequency.

Amplitude.

The main object of the present invention as stated above, is to provide the processing vibrating machines with simple and inexpensive means for producing practically unlimited numbers of different types of vibrations ranging from a simple harmonic straight-line vibration to the most complicated vibrations of substantially epicycloidal type.

Furthermore, this invention offers the possibility of producing in a simple manner, two and/or three-dimensional complex vibrations obtained as the sum of more simple oscillations of different types and frequencies occurring in more than one plane.

Experience has shown that by means of such vibrations extremely advantageous results can be obtained in screening and concentrating operations.

The vibration unit as proposed in this invention offers in combination with the processing vibrating machines, all the aforementioned advantages.

An object of this invention is to produce a mechanism composed of an epicyclic or planetary drive wherein the planetary member (or the planetary member as well as any other rotating member of the drive) are unbalanced.

Such a mechanism will act as a vibration producer with all its rotating unbalanced parts producing simultaneously periodical dynamical impulses.

By simple structural variations a practically unlimited number of different types of vibrations may be obtained to suit any particular case of practical application.

Furthermore, in many cases the form of said vibrations or their intensity, or their direction, can be varied and adjusted by extremely simple means. It must be emphasized that the advantages of the mentioned adjustments are greatly increased by the fact that the said special specific adjustments can be made while the machine is in operation. This permits correct adjustment to be made in accordance with the actual conditions of operation, so that the operator, by observing the performance of the operation, can easily set the machine for "optimum performance." This mode of controlling the operation is particularly important in the operation of screening, concentrating, and similar machines.

Classification of the embodiments of the vibrator:

As already stated, this invention comprises a vibrator composed of an epicyclic drive, the rotating parts of which are unbalanced.

Figure 1:
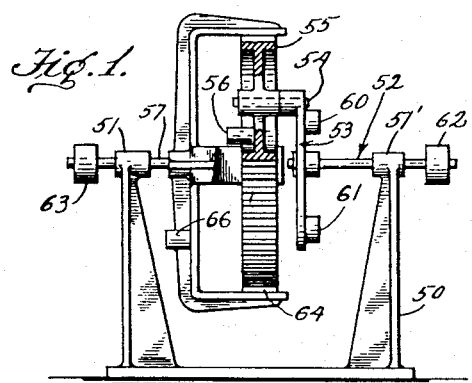

Theoretically, the numerous possible variations of the device may roughly be subdivided in two main classes:

*Class I.*—Corresponding to Figs. 1, 1ᵃ, 1ᵇ, in which all the axes of rotation are parallel.

*Class II.*—Corresponding to Figs. 15, 15ᵃ, 15ᵇ, in which the planetary wheel rotates about a shaft non-parallel to that of the other elements.

The common axis of these elements will herein be called the "principal axis."

Class I may be again sub-divided in 4 sub-classes:

*Class Ia.*—Corresponding to Fig. 1ᵃ, which represents a "simple epicyclic drive" composed of three elements, namely:

(1) "Sun gear" or "first gear" 58.
(2) "Arm" or "carrier" 54.
(3) Planetary gear 55.

*Class Ia¹* is composed of the same elements as Class Ia, with the difference that the planetary member is driven by an endless driving member such as, for example, belt or chain.

*Class Ib.*—Corresponding to Fig. 1; also composed of three elements:

(1) "Second gear" 64, which is also called "orbit" or "internal gear."
(2) "Arm" or "carrier" 54 (same as in Ia).
(3) Planetary gear 55.

Thus the main kinematical difference between the device of the classes Ia (Fig. 1ᵃ) and Ib (Fig. 1) is that when the member 57 is kept stationary in class Ia, the planet-gear rotates in the same direction as that of the carrier arm, while in class Ib it rotates in the opposite direction.

*Class Ic.*—Corresponding to Fig. 1ᵇ, which represents a "complete" epicyclic drive having 3 elements:

(1) "Sun" or "first" gear 58.
(2) Second gear 64.
(3) Planet gear 55ᵃ.

The aforementioned class II may be divided into sub-classes:

*Class IIa.*—In some respects corresponds to sub-class Ib (Fig. 1). The main characteristic is that the axes of the planet-gear and the principal axis are not parallel. In Fig. 15ᵇ, for example, these axes are elements. The common axis of these elements will herein be called the "principal axis."

Class I may be again subdivided in 4 sub-classes:

*Class Ia.*—Corresponding to Fig. 1ᵃ, which represents a "simple epicyclic drive" composed of three elements, namely:

1) "Sun gear" or "first gear" 58.
(2) "Arm" or "carrier" 54 coaxial with the sun gear.
(3) Planetary gear 55.

*Class Ia¹.*—Is composed of the same elements as class Ia, with the difference that the planetary member is driven by an endless driving member such as, for example, belt or chain.

*Class Ib.*—Corresponding to Fig. 1; also composed of three elements:

(1) "Second gear" 64, which is also called "orbit" or "internal gear."
(2) "Arm" or "carrier" 54 (same as in Ia).
(3) Planetary gear 58.

Thus the main kinematical difference between the device of the classes Ia and Ib is that when the member 57 is kept stationary in class Ia, the planet-gear rotates in the same direction as that of the carrier arm, while in class Ib it rotates in the opposite direction.

*Class Ic.*—Corresponding to Fig. 1ᵇ, which represents a "complete" epicyclic drive having 3 elements:

(1) "Sun" or "first" gear.
(2) Second gear.
(3) Planet gear.

The aforementioned class II may be divided into sub-classes:

*Class IIa.*—In some respects corresponds to sub-class Ib. The main characteristic is that the axes of the planet-gear and the principal axis are not parallel. In Fig. 15b, for example, these axes are perpendicular with respect to one another, and the driving connection is established by means of bevel gears. The vibrator represented in Fig. 15 is the same, except that it is rotated by 90° in respect to the body to which it is attached.

Figure 1A:
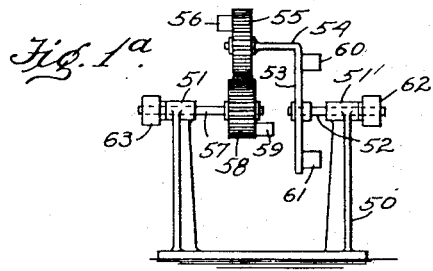
Figure 1B:
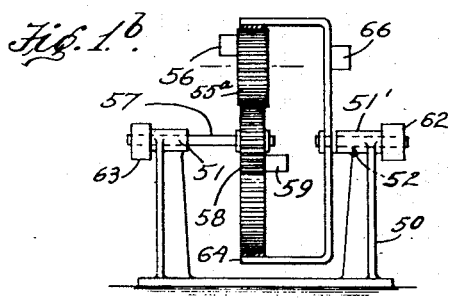

*Class IIb.*—Shown in Fig. 15ª corresponds to the sub-class Ic (Fig. 1b), and is composed of 4 members. In this case the gear 55ª is supported by the arm 52a.

Theory

Mathematically, the action produced by the devices of the class Ia (Fig. 1ª) may be defined as follows:

An unbalanced vibrator rigidly attached to a processing machine (for example, vibrating screen) freely suspended, may be considered as a dynamical system composed of:

(1) Mass-center of the screen; and (2) Mass-center of the unbalanced body in the vibrator.

We apply the law of the "motion of the center of gravity" of any conservative dynamical system, which states:

"If any forces act upon a conservative system of several mass-points, the motion of said points relative to the center of gravity of the system is the same as if the center of gravity were fixed and the same forces acted upon said points."

It can be shown that if a moving (active) weight of a vibrator describes a certain path in the space, the center of gravity of the screen will describe a geometrically-homologous (conjugated) path, the transformation being at the ratio of the magnitude of mass moving within the vibrator to the mass of the screen, the center of gravity of the system being the pole of transformation.

For example, if the active mass describes a straight-line oscillation of a stroke S, the screen will also perform a straight-line oscillation of a stroke $$Sm = \frac{SM1}{M2}$$

M1 being active mass and M2 the mass of the screen.

From this it will be seen that the first step of this investigation is to determine the path of the active masses in the vibrator.

Figure 4:
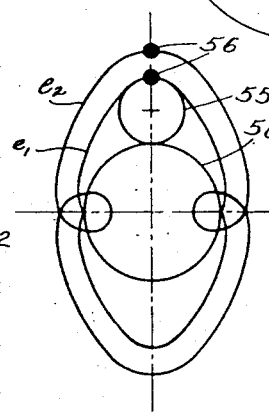
Figure 4 is a curve representing a type of vibration producible by the type of vibrator shown in Figure 1$^a$.

From simple geometrical construction, it may immediately be found that the path of point 56 in the plane normal to the principal axis will be of the type ($e_1$) in Fig. 4. If the mass is located at a major radius, the curve would be of the form ($e_2$). A free suspended screen activated by such a vibrator (rigidly attached thereto) would perform an oscillation of a geometrically homologous path.

Figure 2:
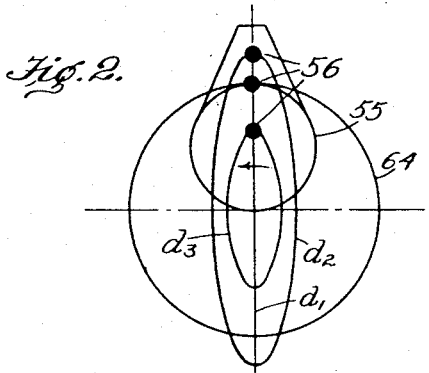
Figures 2, 3 are curves representing some types of vibration (producible by the type of vibrator shown in Figure 1).
Figure 3:
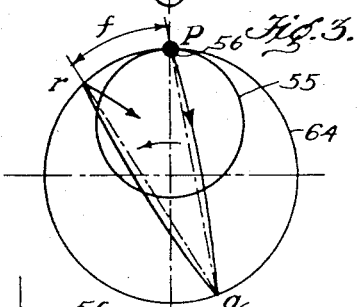

Some forms of vibrations with various gear ratios are shown in Figs. 2 and 3.

In Fig. 2 the gear ratio is 1:2.

In Fig. 3 it is a little more than 1:2.

If in the arrangement of Fig. 2 the active mass-center 56 be placed on the pitch radius of the planet-gear, we obtain a straight-line motion ($d_1$) identical in all respects to the simple harmonic motion.

The motion shown in Fig. 3 is of particular interest; here the motion of the point 56 is a nearly-straight line, but its general direction $p$—$q$ in respect to the screening machine, changes by a constant angle ($f$) with each revolution of the arm 54.

This kind of motion is particularly advantageous for certain difficult screening problems. A screen with such a vibrator during a complete cycle of variation of direction will be submitted to an approximately straight-line vibration in all directions in a plane normal to its screening surfaces and will therefore perform a completely new kind of periodically combined sifting action and perpendicular vibration, giving remarkable efficient close sizing and mesh-cleaning action not obtainable with any other machine known. It also will add a new effect in separation of different materials on concentrating tables and similar machines.

Generally, if the gear ratio is represented by a whole number, the path of vibration will remain stable in respect to the frame of the vibrator (and consequently in respect to the processing machine) as shown, for example, in Figs. 2 and 4, whereas if the ratio is a fractional number, the path of the vibration will cyclically change its angular position with each revolution of the arm. Fig. 3 represents a particular case of such arrangement.

Particularly important practical results are obtained if the member 58 is kept stationary and only the member 52 is rotated. In this case, as stated above, when a whole-number-ratio is used, the path of vibration will remain stationary. The position (or direction) of said path will depend upon the angular position of the stationary member 58; hence by providing the device with suitable adjusting means we will make it possible to vary the direction of vibration to which the material on a given processing machine is submitted, so as to obtain the optimum of operation.

Taking, as example, a screening machine provided with a vibrator of the type shown in Fig. 9 having a gear ratio of 1:2 and only one active mass 56, we will obtain, as explained above, a simple harmonic straight-line motion. By varying the direction of said motion we will be able to greatly influence the quality of the screening operation, since the inclination of the vibration on the one hand influences the conveying motion of the material on the screen surface, and on the other hand affects the self-cleansing of the meshes. Thus by varying the inclination both these characteristics may be combined in such a proportion as to obtain the optimum capacity and efficiency.

The vibration form obtainable with arrangements as in Figs. 15, 15ª and 15b will be of more complicated, generally tridimensional, form and may be determined as "multi-planar" because the active masses will not move in one plane alone or in parallel planes as before (Figs. 1ª, 1, 1b) but in several planes generally not parallel to one another.

In a general case when the member 54 is unbalanced in respect to both the principal axis 57 and planetary axis 78 (Figs. 15 and 18), a complex vibration would be produced which can be considered as a combination of a gyratory motion in a plane perpendicular to the principal axis (induced by the mass 67) with another gyratory motion lying in a plane parallel to the principal axis and rotating about the same axis (induced by the mass 56). Any of the devices of the class shown in Figs. 15b, 15ª and 15 should be connected to the processing machine in a position whereby the component vibrations occurring in the respective different planes are utilized to best advantage.

In the simplest case of Fig. 15 which represents a "bevel epi-cyclic gear-train" there will be two systems of impulses, the one occurring in a plane containing the mass 66, which plane is normal to the principal axis, and the other occurring by reason of impulses of the mass 56". Supposing that the weight 67 serves for balancing the weight of the planetary gear 55 about the principal axis and that the active mass 56" lies in a plane passing through the principal axis, the impulses given by the latter will always occur in two planes, one containing the principal axis and the other containing the planetary axis.

The geometrical form of the path of the mass will be of a helical type lying on a spherical surface of a radius equal to the mass-lever 56", which is the expression herein used to define eccentricity of the mass with respect to its axis of revolution.

A great variety of motions may be obtained by proportioning the gear ratio and phase of the gears 55 and 53, and also by varying the ratios of the masses 66 and 56".

As a particular case, the mass 56" may be caused to move along a circle normal to the planetary axis, or normal to the principal axis.

In Fig. 16 is shown diagrammatically the movement of mass 56" in its plane normal to the axis 54, said plane simultaneously rotating with the axis 52 as shown by the arrow $n$.

The force component that is active with respect to the screen will cause a vibration with cyclic variations of the magnitude of vibrating stroke $i$ between zero and a maximum value $J$ (Fig. 17).

Up to this point we have considered the geometrical form of the path of vibration without any regard to the real magnitude and distribution of active forces developed by the device. Now we shall consider the action of the vibrator from a dynamic point of view.

This can be done in mathematical form by using the well-known Newton's and D'Alembert's principles.

The components of acceleration, X and Y, of a planetary mass $m$ may be expressed by the following formulae:

$$X = w^2 (R \cos a - e^2 r \cos ea)$$
$$Y = w^2 (R \sin a - e^2 r \sin ea)$$

where $w$ is the differential angular velocity of the coaxial members.
R = the length of the arm.
$r$ = the mass-lever or eccentricity of the unbalanced planetary mass-center with respect to the planetary axis.
$a$ = the angular position of the arm with respect to a given zero position.
$e$ = the angular speed ratio between the driving arm R and the mass-lever $r$, the direction of which latter will depend upon constructional forms of the drive (see Figs. 1a, 1, 1b).

From the above formula it will be seen that the vibration supplied by this form of the vibrator is generally composed of at least two sets of vibrations of different amplitudes and phases, as already stated.

As an example, let us consider the arrangement as in Fig. 1 with only one active mass 56 placed at a distance $r$ from its axis of rotation.

If the member 57 be kept stationary and the gear ratio is 1:2, we obtain the following expressions for instantaneous components of forces due to the acceleration:

$$F_x = -2mw^2 r (\cos a + 2 \cos 2a)$$
$$F_y = -2mw^2 r (\sin a + 2 \sin 2a)$$

$a$ being the angular position of the arm 54 at the given time and $r$ being the length of the mass-lever of the mass $m$.

Figures 6, 7, 8:
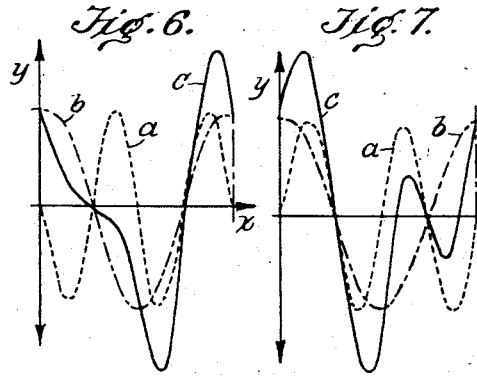
Figures 5, 6, 7 are curves representing some type of vibration produced by vibrators shown in Figures 1, 1$^a$, 1$^b$.
Figure 8 is a diagram of the accelerations.
Figure 5:
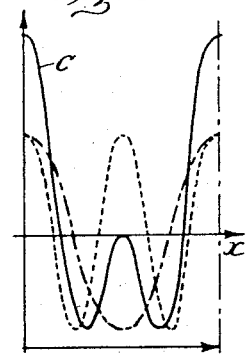

The Figs. 5, 6 and 7 show the diagram of the position of mass $m$ for three cases when three different phase displacements are used between the angular position of the mass 60 and the plane of projection of the considered force $F_x$.

Fig. 8 represents the diagram of forces $F_x$. It will be clear from the examination of this diagram that the advantages of such a motion applied to a screening or concentrating machine lies in the possibility of obtaining unsymmetrical accelerations during the up and down strokes, this feature being of basic importance in many screening and concentrating operations.

In Figures 1a, 1, 1b, 15b, 15a, 15 are shown diagrammatically various aspects of the invention: the frame 50 carries by means of bearings 51 and 51' two rotatable members 57 and 52. Member 57 carries a concentric gear 58 (in Figures 1a and 1b) or an internal gear (orbit) 64 (in Figure 1). Member 52 is provided with a shaft 54 located eccentrically in respect to the axis of member 52. On the said eccentric shaft is mounted a planetary gear 55 engaged with the gear 58 or 64. Members 62 and 63 may be driven by a motor with different velocities and directions of rotation. Each and every one of the members 52, 53, 55, and 57 may be unbalanced. The unbalancing weights are represented by numbers 56, 60, 61, 66, 67, and 56". The weight 60 attached to the arm 52 represents symbolically the weight of the planetary member 55, with its shaft. The second weight 61 attached to the same arm 52 is shown with the purpose to make it clear that the member 52 may be unbalanced to any desired degree, or also completely balanced if pure epicycloidal vibration is desired, as will be explained.

Similarly, weight 67 in Figs. 15b, 15a and 15 shows that the weight of the gear 55 or 55a may be balanced in respect to the common axis of members 57 and 52 (principal axis). If at least one of the shafts 52 or 57 is rotated, the eccentric weights, one or more as the case may be, create disturbing periodical vibratory impulses which are transmitted through the bearings to the frame. If the frame is engaged or is attached to the device, machine, container, (or any other body or substance to be vibrated) the so-produced vibrations are thus communicated thereto through said frame.

Referring to Figure 1 an additional unbalancing weight can also be affixed to the arm 53 or to any extension of the said arm; such eventual additional weight is shown schematically by the weight 60 or by the weight 61. The shafts 52 and 57 may be provided with transmission pulleys, wheels or the like, 62 and 63, or be directly coupled with the motor. Either of the shafts 52 or 57 could be driven by means of a motor.

Particular practical results as will be explained later are obtained if member 58 is kept stationary and only member 52 is rotated; in this case member 58 may be angularly adjusted and fixed in the wanted position by means of clamps 65 (see Fig. 9) and handle 71 (see Fig. 10), or worm gear transmission 72, 73 in Fig. 12.

More than one satellite gear can also be used in order to obtain some particular types of vibration.

The unbalancing effect of the mass-centers may be obtained by weights added and rigidly affixed to the respective parts or may constitute one body with the said respective parts. They may be apparently visible or incorporated into any of the said parts not necessarily visible. The unbalanced weight may also be obtained by employing materials of different specific gravity or by providing the said parts with holes. Furthermore, each or any of the said unbalancing weights may further be provided with means which may increase or diminish the distance of their respective action of rotation.

A further aspect of the invention is shown in Fig. 9, which corresponds to the diagrammatical Fig. 1. The main difference between this arrangement and the one shown in Fig. 1 consists in using a drum-shaped casing with internal gear teeth 77', the teeth of planetary gear 55 being here designated by numeral 77'. Member 52 may be rotated while member 63 is kept stationary, and angularly adjusted, or both these members may be rotated at the same time.

A still further aspect is represented in Fig. 13. In this construction, the members 57 and 55, besides being provided with toothed surfaces 77 and 77' are also provided with smooth rolling surfaces 76 and 48. Gear 55 is connected to arm 53 by means of a resilient or sliding or swinging connection as, for example, 75 in Figure 14. The centrifugal forces generated by the unbalanced weight of member 55 are transmitted directly through the rolling surface 48 and 76; thus the supporting means of said member 55 remains free from the action of the mentioned centrifugal forces. The supporting means 75 may also be designed and set in order to exert a certain pressure between the rolling surfaces.

Still another embodiment of this invention is shown in Figures 13 and 14 where a rolling track is used in which the necessary pressure between the rolling surfaces is obtained by centrifugal force in combination with the action of supporting means, e. g. 75. The planetary gear 55 is kept in permanent contact with the internal track surface 76 of the casing by reason of centrifugal force acting upon the planetary gear 55 which is resiliently mounted upon the rotary arm 53 by means of resilient mountings 75. In this connection it is also visualized to provide for frictional contact alone without the aid of gear teeth in transmitting driving forces within the vibrator.

The constructional form as represented in Figure 11 is mechanically similar to that shown in Figures 9 and 13. The casing 96 is stationary, and is provided with rolling surfaces 76 while a separate annular gear 64 with internal toothing 77 engaged with a satellite gear 55. Said annular gear is angularly adjustable in respect to the said casing by means of a worm drive 72 and 73 (Figure 12) carried by the said casing 57. The casing is closed from the side of the gear drive by means of a cover 74.

A further aspect of this invention, corresponding to the scheme in Fig. 15, is represented in Fig. 18. Frame 50 carries two co-axial members 52 and 57, the first of which is rotatable by means of a directly coupled motor 80, and the second is angularly adjustable by means of a handle 71 and can be fixed in any position by means of a screw 65. On member 52 a shaft or member 54 is journaled perpendicularly to the axis of the said member 52. The members 54 and 57 are operatively connected by means of bevel gears 55 and 58. Member 54 is provided with two off-balance weights 56 and 56'.

If member 54 is balanced in respect to axis 57 there will be only one set of impulses produced in a plane normal to axis 78. In this case, the projection of the centrifugal forces of weights 56 and 56' on a plane parallel to axis 57 would be represented by the curve in Fig. 17; it will be seen that the ampltiude of the impulses changes periodically with the frequency of shaft 52, while the frequency of the impulses themselves corresponds to the speed of member 54.

In the above described case the balancing of member 54 in respect to the aixs 57 can be obtained by proportioning member 67 in respect to the weight of gear 55.

It is to be understood that whereas I have herewith shown and described a practical operative device, many changes in size, shape, number and disposition of the parts can nevertheless be made without departing from the characteristic properties of the invention, and I wish, therefore, that my showing be taken in a diagrammatic sense and that my invention be not limited to the precise showing. In this respect the principal functionally different forms of the apparatus may be obtained by the following means, used separately or in combination:

(A) Providing the drive with one or more satellites.

(B) Placing the off-balanceweights in different positions (phases) relatively to each other and to the processing vibrating machine.

(C) Placing the satellites at different distances from the axis of the members 52, 54 and 57 and from each other.

(D) Using different speeds of rotation of the satellite.

(E) Providing the members 57 and 52 with different speeds and/or directions of rotation.

(F) By locking either one of the members 57 or 52 while rotating the other.

It is to be clearly understood that the above mentioned examples of constructional variations may be applied to all the types of the devices shown.

The preferred application of this vibration producer is in the three general ways, as follows:

1. By means of rigid attachment to the vibratable processing machine.

2. By means of resilient, energy-storing dynamically-active connection with the processing machine commonly defined also as a "resonance system."

3. By means of a connection which "rigidly" transmits the components of the impulses in only one direction or plane. The theoretical aspect of the "rigid connnection" was already mentioned in the theoretical part of this specification.

An example of a general arrangement of the "rigid connection" is shown in Figs. 19, 20, where 81 is a supporting structure, 86 a vibratable processing machine, suspended by "soft" (inactive) springs 82. The vibrating unit 83 is rigidly attached beneath the machine and is driven by motor 85 through the belt 84. The vibrator 83 diagrammatically represents any one of the vibration producers shown in Figs. 1ᵃ, 1, 1ᵇ, 15ᵇ, 15ᵃ and 15.

The vibrator may also be doubled and symetrically attached to both sides of the machine. The driving parts can be connected by a common shaft running through (or across) the machine.

When the vibrator is rigidly attached to the vibrating machine freely suspended to the supporting structure, the oscillation of said machine will be controlled by the well-known law of the motion of the center of the gravity as already mentioned; thus the machine will perform oscillations of a form conjugated to that of the oscillation of the mass center of the unbalanced weights.

Some examples of the possible types of oscillations obtainable in this manner are diagrammatically represented in Figs. 2 and 3. When the ratio of the gears 55 and 64 is 1 to 2 and the mass center 56 is on the pitch radius, the path of the vibration is a straight-line $d_1$ (Fig. 2). The mass center not located on the rolling surface would produce an elliptical oscillation, $d_2$ or $d_3$ (Fig. 2).

It must be clearly understood that the vibrating unit can be constructed and applied not only as a single (simple) unit as shown in Figs. 1a, 1, 1b, 15b, 15a and 15, but can be duplicated and symmetrically applied to the two sides of a processing machine.

For special purposes, in combination with the vibrating processing machines, arrangements can be used in which more than one vibrator of any of the described types, is used with the processing machine, or even a combination of vibrators of different types is used, the said vibration may be operated simultaneously or independently of each other.

As already mentioned, an important application of the device is in screening of granular materials.

Many factors are involved in screening. In all screening operations, some sort of motion must be imparted to the screening surface so that the particles composing the material to be screened are kept in constant motion on the sieve surface. While this principle seems a simple one, the screening practices and theoretical considerations show that in order to obtain maximum efficiency and capacity many separate factors are involved, which interdependence is extremely complicated, and must be taken into consideration in designing screening machines.

For a given set of physical properties of material and conditions of operation, the effect of operation would especially depend upon the type of movement to which the material is submitted. Considered in a schematic way, this movement must produce the following results:

1. Conveying the material along the screen from the feed end to the discharge.
2. Provide the particles with enough acceleration in order to prevent the particles wedging in the apertures of the cloth, technically known as "blinding."
3. Shake up the material so as to force every particle to meet the mesh openings as many times as possible, and in as many positions as possible.
4. Stratify the bed of material, allowing the fine particles to pass down to meet the cloth.

When the commercial application of these simple principles is attempted, numerous complicating factors are introduced. Experience shows e. g. that the optimum effect of the four above-mentioned actions is obtained with different characteristics of movement for each of the said actions.

From this, it will be seen that the mechanical problem of applying a vibration to the screening surface is not as simple as it appears to be. The studies made by me have shown that the optimum screening result cannot be obtained with a simple harmonic motion no matter how applied.

Concerning the most effective types of vibration to be used for obtaining the best results with a given material and a given range of sizes in the four mentioned cases, I have come to the following conclusions:

For conveying the material a comparatively low frequency must be used. The speed (V) of the material along the screening surface can be expressed by a simple equation:

$$V = \frac{n \cdot r}{k}$$

where $n$ is the frequency, $r$ is the amplitude. $k$ represents a coefficient embodying the geometrical and physical conditions of the operation.

For enabling the "near mesh" particles to pass through the openings, a high frequency vibration of very small amplitude gives the best results. In this case the frequency is considerably higher and the amplitude lower than in the previous case.

The best stratifying action of the bed of the material is obtained by means of a comparatively slow differential oscillation, however, the aforementioned conveying oscillation would produce a satisfactory result in this respect.

I have found that the aforementioned specific actions may be obtained and influenced individually by the two different types of vibration, notwithstanding the fact that they are superposed upon one another.

As an example, the action mentioned under paragraph marked 1 can be obtained by a circular vertical oscillation with frequency of 500 per minute and an amplitude of ½ inch, while the effect mentioned by paragraphs marked 2, 3 and 4 would be obtained by a straight-line vibration normal to the screening surface with a frequency of 2000 per minute and an amplitude of $\frac{1}{32}$ of an inch.

In order to simultaneously obtain the aforementioned results, a new method of treatment is proposed in the present invention. This method consists in providing the screening surface with a complex motion which theoretically can be split in at least two more simple oscillations of different geometrical form, frequency and amplitude.

The aspect of the method relating to the uni-dimensional motion can be realized by subjecting the material to be treated to at least two straight-line oscillations of different frequencies. The frequencies and phases of these oscillations should be so chosen and adjusted as to provide a resultant oscillation which would present a periodical variation of the resultant amplitudes. It may also be adjusted in order to obtain a resultant motion of differential type, i. e. having maximum value of acceleration in one direction different from that in the opposite direction.

These types of motions, particularly advantageous for separating operations as well as for conveying and screening, are now obtained only by expensive and complicated crank and lever mechanisms.

Another aspect of this invention is represented in a type of uni-dimensional reciprocating motion, which strictly speaking, can also be classified as a two-dimensional motion, is obtained by subjecting the material to be treated to a straight-line reciprocating motion which direction continuously rotates in its own plane. As already mentioned, this motion is particularly advantageous for screening purposes and may be applied in a plane perpendicular to the screening surface as well as at any angle to the said plane, or even in the same plane of the screening surface. A series of tests made on a fine mesh screen of this type with very difficult materials showed a surprisingly high capacity and efficiency.

The proposed method would also give particularly advantageous results when applied to the multiple deck screens, with different meshes on each deck. In this case, as stated above, every mesh would require for optimum effect, a different set of vibration conditions which obviously cannot be obtained with the simple vibration now being used by the screen manufacturers, while the proposed method would provide every deck with a combination of motions appropriate for a given mesh. On the other hand, the method according to this invention, would be very useful with the horizontal screens now coming into general use, because of its conveying action which can be performed without sacrificing the screening action.

Particularly interesting results can also be obtained with upwardly inclined screens in which the over-size is discharged on the highest end of the screen. These screens would give extremely efficient work in "counter-flow" operation; where the conveying oscillation is directed uphill while the "screening" oscillation is set up in order to obtain optimum results independently from all other conditions.

It must be emphasized that the just described method of treatment can be applied for purposes of separation of granular materials of different physical characteristics.

In this field the type of vibration employed has even more bearing on the efficiency of the operation than in the screening work. The proposed complex vibration method can be used in combination with concentractors or separating tables, working with water or action or penumatic flotation. Furthermore, in many cases, an economically perfect operation can be obtained by the proposed method without any air or water action, namely, materials such as coal, cereals, asbestos fibers and similar materials can be cleaned, separated and classified on very simple machines similar in their action to the screens working "counter-flow," where the light or fluffy ingredients would climb uphill the screen surface while the heavier particles would be discharged from the lower side of the vibrating surface. One of the examples of this type of machine is discussed in the co-appending patent application Serial No. 229,226 filed Sept. 9, 1938.

Another aspect of the method, according to this invention, relates to the two-dimensional motion and can be realized by simultaneously subjecting the material to be treated to two motions, one of which may be a circular and the other a straight-line and both of which are performed in the same plane. The technical result of the motion so obtained would provide a differential vibration treatment.

Still another aspect of the method, according to this invention, relates to the three-dimensional motion and can be realized by subjecting the material to be treated to a motion which may preferably be obtained from a simple elliptical or gyratory oscillation, the plane of which continuously rotates about an axis stationary in respect to the processing machine.

This kind of motion can be produced by the devices shown in Figures 18, 15ᵇ, 15ᵃ, and 15. These vibration producers may be attached to the vibrating machine in different positions, thereby effecting different results as may be required.

All of the described methods may be advantageously applied in screening, separating, classifying, compacting, centrifuging, filtering, clarifying operations, as well as in operations related to vibration treatment of metals, alloys and other castable materials applicable while the material is in liquid or semi-liquid state.

Having now particularly described and ascertained the nature of this invention and in what manner the same is to be performed, I declare that what I claim is:

1. In combination with a vibratory processing machine, a mechanical vibrator operatively associated with the vibratory processing machine for motivating the same, said vibrator comprising a frame, an epicyclic wheel train mounted on said frame, and having two co-axial members at least one of which is rotatable about a first axis, and at least one planetary member operatively interposed between said two members and mounted for rotation relative to one of said co-axial members about a second axis which is different from said first axis, the center of gravity of said planetary member being eccentric to said second axis, whereby when said wheel train is operating the effect of dynamic forces created by the unbalance produces a predetermined type of vibration of said frame and thus of said vibrating processing machine operatively associated with said frame.

2. A mechanical vibrator according to claim 1, in which one of said co-axial members is normally non-rotatable, but rotatably adjustable.

3. In combination with a vibratory processing machine, a mechanical vibrator operatively associated with the vibratory processing machine for motivating the same, said vibrator comprising a frame, an epicyclic wheel train mounted on said frame, and having two co-axial members at least one of which is rotatable, and at least one planetary member operatively interposed between said two members, the rotary axis of which planetary member is parallel to those of said two members, of the rotatable members of said train at least said planetary member being unbalanced, whereby when the vibrator is operating the effect of dynamic forces created by said unbalance produces a predetermined type of vibration of said frame and therethrough of the vibratory processing machine operatively associated with said frame, the unbalancing forces occurring in parallel planes perpendicular to said axes.

4. A mechanical vibrator according to claim 3, in which one of the two co-axial members comprises an annular portion having internally disposed means extending along the inner circumference of said annular portion for operative engagement with said planetary member, and in which the other of the two members comprises a rotary arm, and the planetary member is carried by said arm and has driving engagement through said internally disposed means with said annular portion.

5. A mechanical vibrator according to claim 3, in which one of the two co-axial members comprises an annular internal gear, and the other of the two co-axial members comprises a rotary arm, and the planetary member is a gear carried by said arm for driving engagement with said annular internal gear, and in which there is provided a circular internal track fixedly associated with the annular internal gear, the effective track surface representing a diameter substantially corresponding to the pitch diameter of the orbit gear, and the planetary gear has a running portion adapted to engage and operate upon said track when the planetary gear and the annular internal gear are in proper mesh, and means for effecting radially non-rigid cooperative relationship between the orbit gear and the planetary gear.

6. In combination with a vibratory processing machine, a mechanical vibrator operatively associated with the vibratory processing machine for motivating the same, said vibrator comprising a frame, an epicycle wheel train mounted on said frame, and having two co-axial members, having a common principal axis, at least one of which members is rotatable, and at least one planetary member operatively interposed between said two members in a manner whereby the rotary axis of the planetary member relative to one of said co-axial members is disposed at an angle with respect to said principal axis, of the members of said train at least said planetary member being unbalanced relative to said second named axis, whereby when said wheel train is operating, the effect of dynamic forces created by the unbalance produces a predetermined type of vibration of said frame and thus of the vibratory processing machine operatively associated with said frame.

7. A mechanical vibrator according to claim 1, in which one of said coaxial members is fixed.

8. A mechanical vibrator comprising a frame, a stationary internal ring gear mounted on said frame, a rotary member journalled in said frame and having an axis of rotation concentric with said ring gear, a planetary member carried by said rotary member and comprising a planetary gear meshing with said ring gear and having an axis of rotation relative to said rotary member displaced from but parallel to the axis of rotation of said rotary member, the center of mass of said planetary member being eccentric to the axis of rotation of said planetary member relative to said rotary member.

LEON M. DE KANSKI.